US010186996B1

(12) United States Patent
Holliday et al.

(10) Patent No.: US 10,186,996 B1
(45) Date of Patent: Jan. 22, 2019

(54) METHODS FOR OPERATING ELECTRICAL POWER SYSTEMS

(71) Applicant: General Electric Company, Schenectady, NY (US)

(72) Inventors: Cornelius Edward Holliday, Forest, VA (US); David Smith, Daleville, VA (US)

(73) Assignee: GENERAL ELECTRINC COMPANY, Schenectady, NY (US)

( * ) Notice: Subject to any disclaimer, the term of this patent is extended or adjusted under 35 U.S.C. 154(b) by 0 days.

(21) Appl. No.: 15/705,685

(22) Filed: Sep. 15, 2017

(51) Int. Cl.
F03D 7/00 (2006.01)
H02P 9/00 (2006.01)
H02P 9/10 (2006.01)
H02P 101/15 (2016.01)

(52) U.S. Cl.
CPC .............. H02P 9/007 (2013.01); H02P 9/102 (2013.01); H02P 9/107 (2013.01); F03D 7/00 (2013.01); F05B 2260/903 (2013.01); H02P 2101/15 (2015.01)

(58) Field of Classification Search
USPC .............................................. 322/87; 290/52
See application file for complete search history.

(56) References Cited

U.S. PATENT DOCUMENTS

| | | | | | |
|---|---|---|---|---|---|
| 4,039,914 A | * | 8/1977 | Steigerwald | .............. | H02P 3/22 318/375 |
| 5,589,743 A | * | 12/1996 | King | .............. | B60K 6/36 318/139 |
| 6,093,975 A | * | 7/2000 | Peticolas | .............. | F02C 9/56 290/40 A |
| 6,265,786 B1 | * | 7/2001 | Bosley | .............. | E21B 47/0008 290/46 |
| 6,301,130 B1 | * | 10/2001 | Aiello | .............. | H02M 7/49 363/37 |
| 6,355,987 B1 | * | 3/2002 | Bixel | .............. | H02P 9/08 290/52 |
| 6,486,568 B1 | * | 11/2002 | King | .............. | B60L 11/02 307/66 |
| 6,495,929 B2 | * | 12/2002 | Bosley | .............. | F02C 9/56 290/52 |
| 6,710,574 B2 | * | 3/2004 | Davis | .............. | H02P 7/2815 318/800 |
| 6,870,279 B2 | * | 3/2005 | Gilbreth | .............. | H02J 1/10 290/52 |
| 6,958,550 B2 | * | 10/2005 | Gilbreth | .............. | H02J 1/10 290/2 |
| 2002/0030364 A1 | * | 3/2002 | Bosley | .............. | F02C 9/56 290/7 |
| 2002/0198648 A1 | * | 12/2002 | Gilbreth | .............. | H02J 1/10 701/100 |
| 2003/0057916 A1 | * | 3/2003 | Davis | .............. | H02P 7/2815 318/800 |

(Continued)

Primary Examiner — Pedro J Cuevas
(74) Attorney, Agent, or Firm — Dority & Manning, P.A.

(57) ABSTRACT

A method for operating an electrical power system includes disabling bridge switching of one of the rotor-side converter or line-side converter. The method further includes gating on the dynamic brake after the disabling occurs, comparing a power converter input variable to a primary predetermined variable threshold, and forcing the gated-on dynamic brake to a 100 percent duty cycle when the power converter input variable exceeds the primary predetermined variable threshold.

20 Claims, 6 Drawing Sheets

(56) References Cited

U.S. PATENT DOCUMENTS

| | | | |
|---|---|---|---|
| 2004/0080165 A1* | 4/2004 | Geis | F01D 15/08 290/52 |
| 2004/0245783 A1* | 12/2004 | Gilbreth | H02J 1/10 290/52 |
| 2006/0066112 A1* | 3/2006 | Geis | F01D 15/08 290/52 |

* cited by examiner

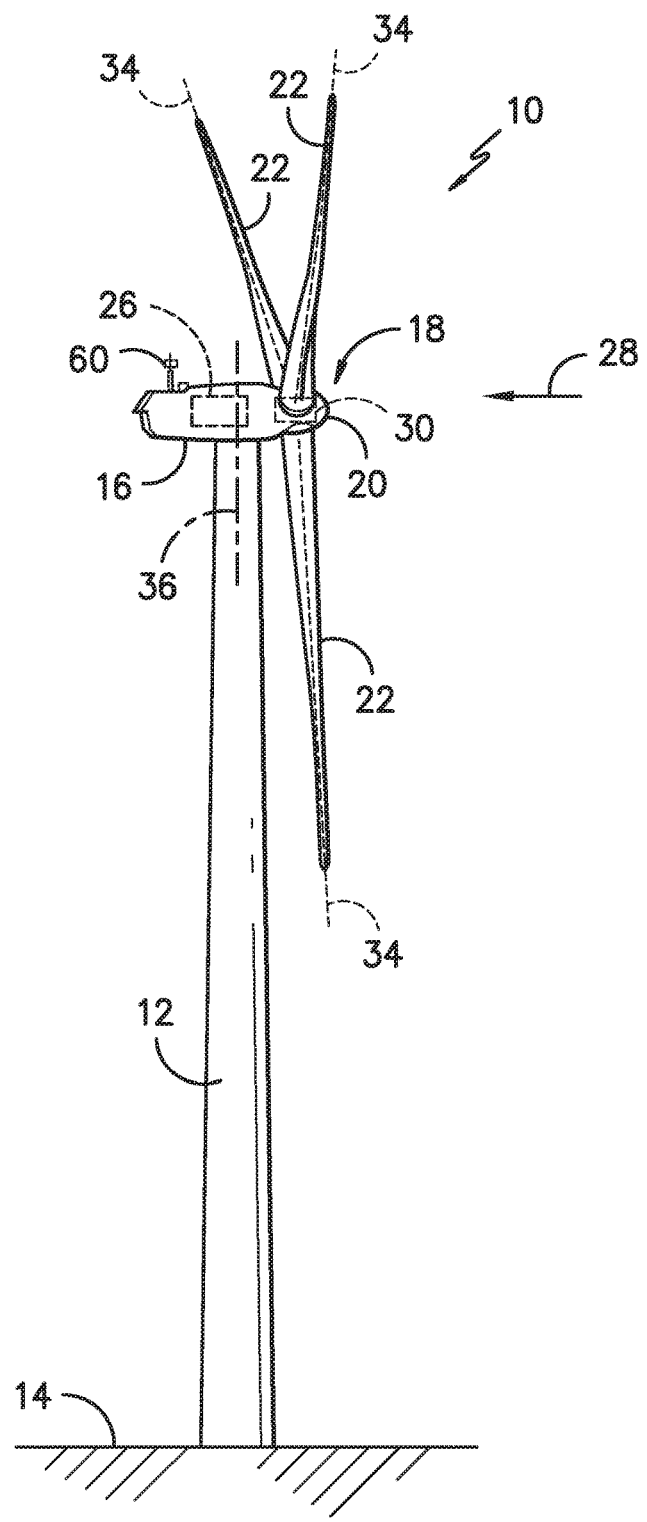
FIG. -1-

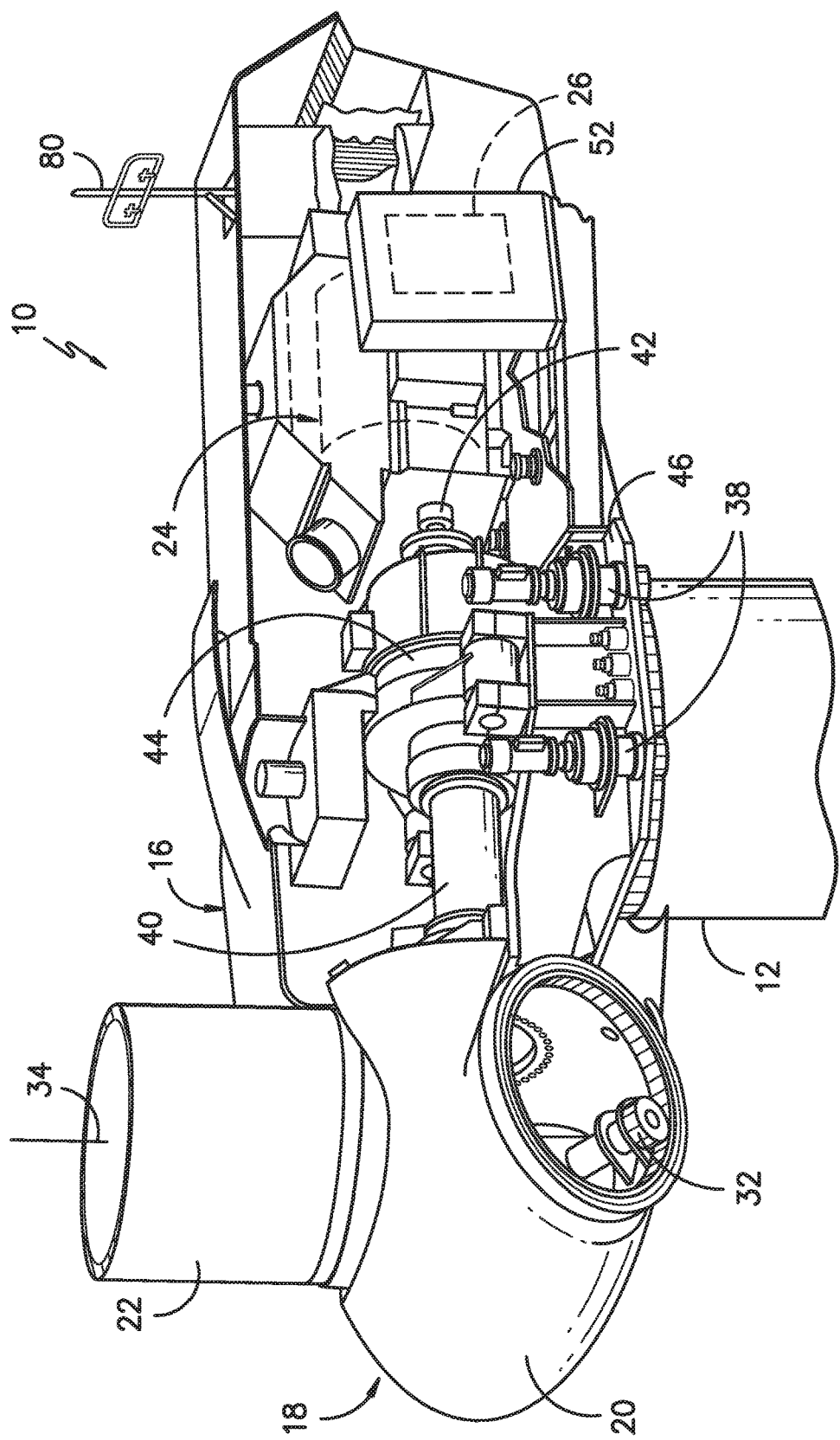
FIG. -2-

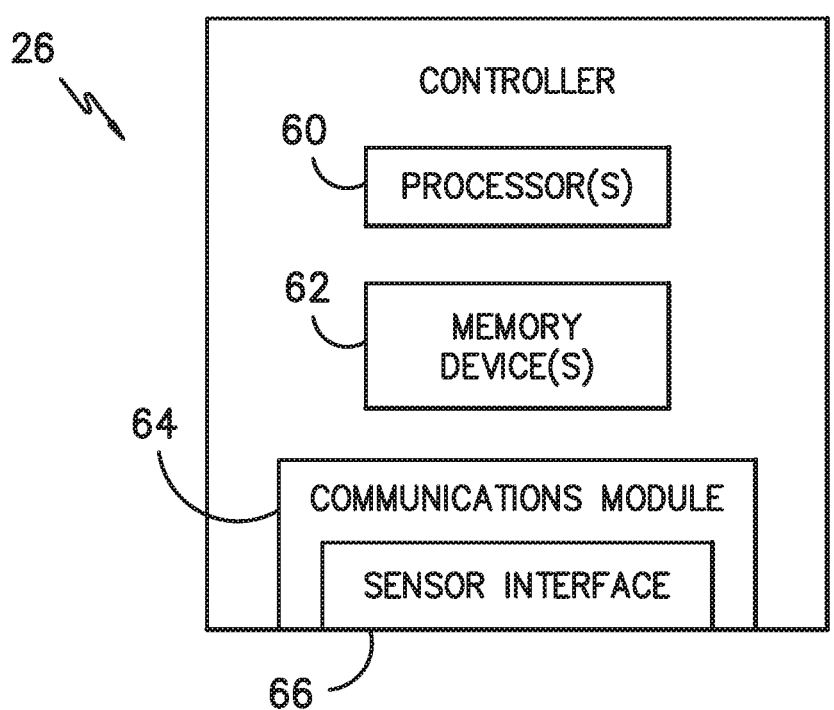
FIG. -3-

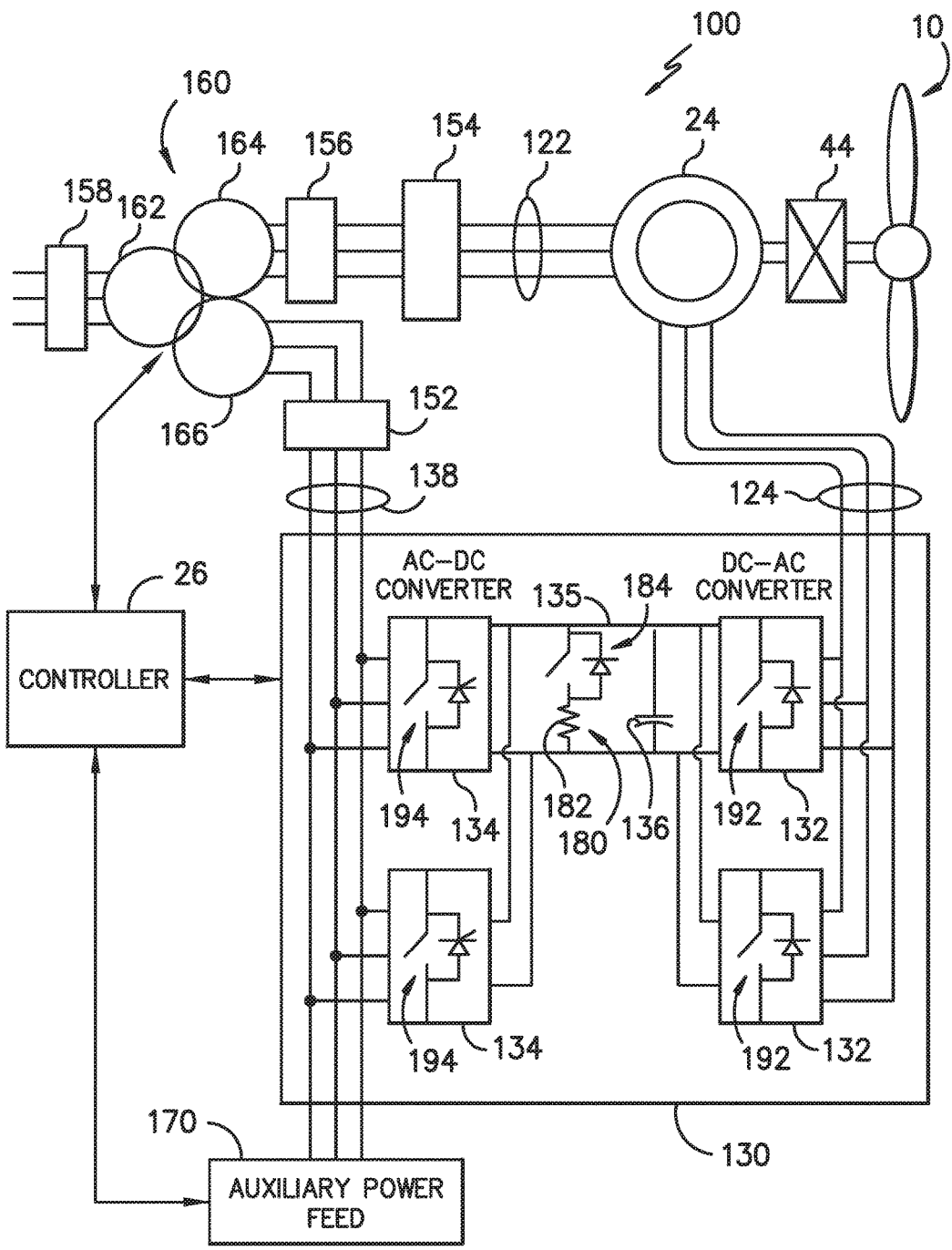
FIG. -4-

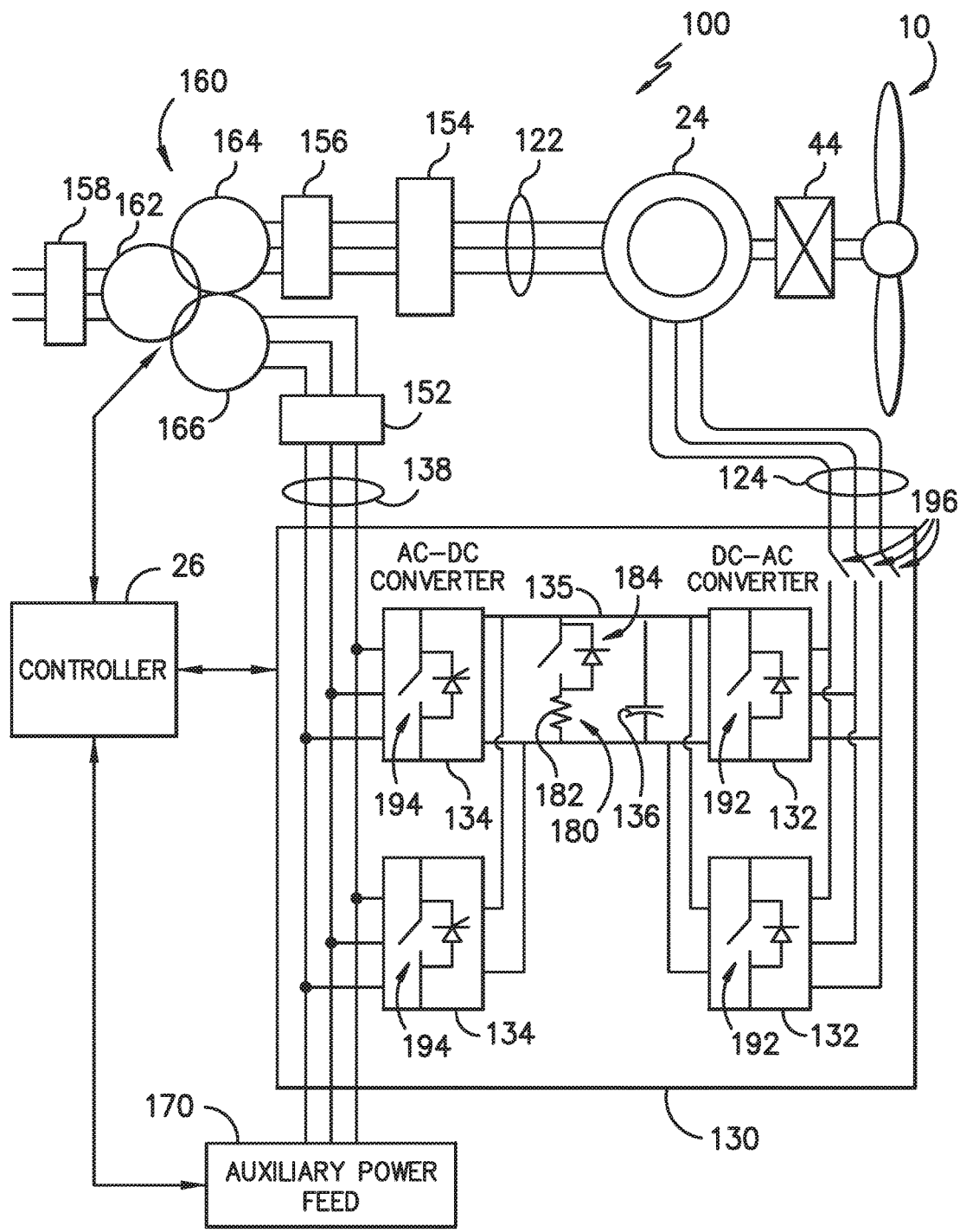
FIG. -5-

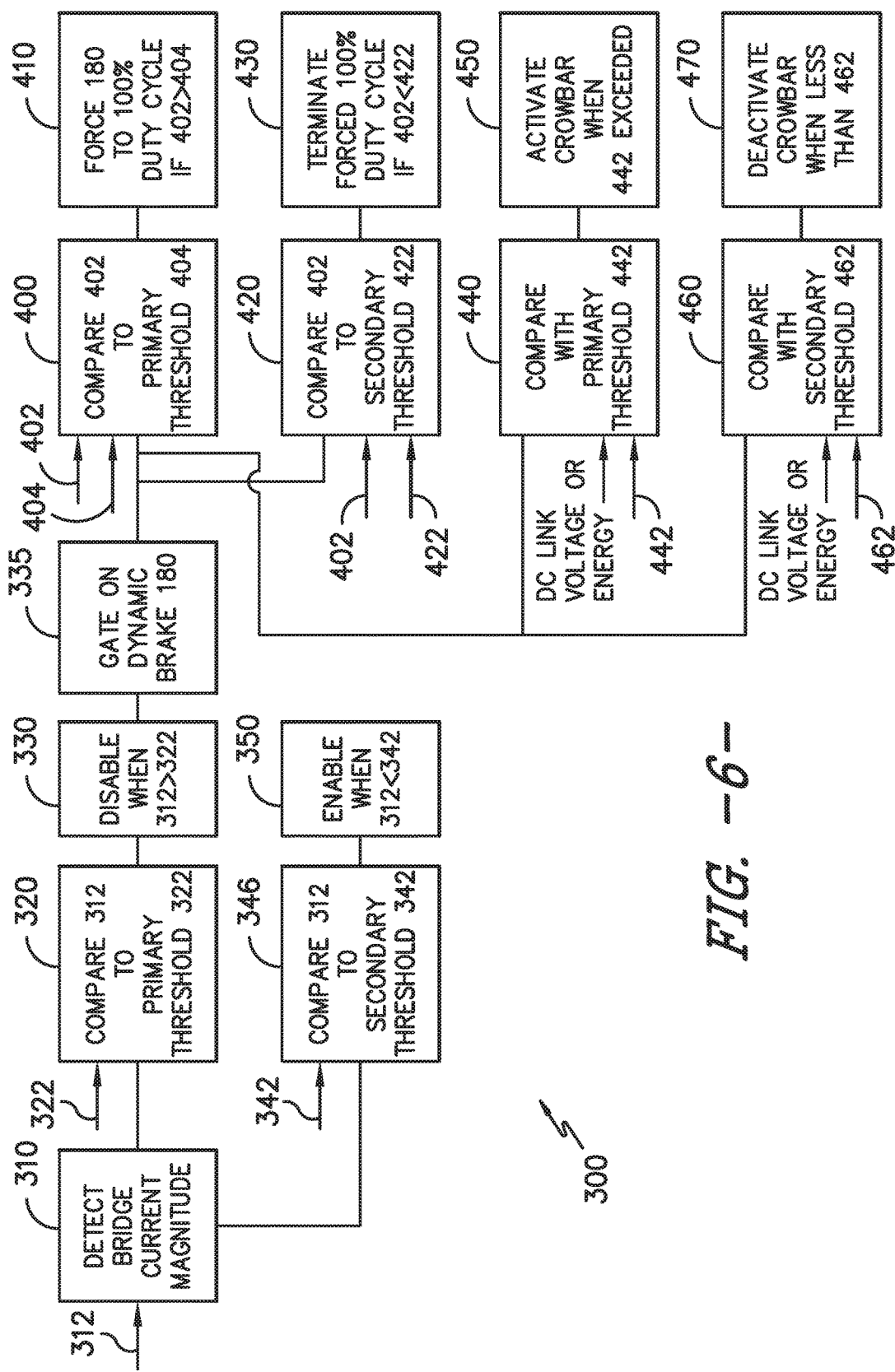
FIG. -6-

METHODS FOR OPERATING ELECTRICAL POWER SYSTEMS

FIELD OF THE INVENTION

The present disclosure relates generally to electrical power systems for providing power to a power grid from, for example, wind turbines.

BACKGROUND OF THE INVENTION

Wind turbines have received increased attention as a renewable energy source. Wind turbines use the wind to generate electricity. The wind turns multiple blades connected to a rotor. The spin of the blades caused by the wind spins a shaft of the rotor, which connects to a generator that generates electricity. Certain wind turbines include a doubly fed induction generator (DFIG) to convert wind energy into electrical power suitable for output to an electrical grid. DFIGs are typically connected to a converter that regulates the flow of electrical power between the DFIG and the grid. More particularly, the converter allows the wind turbine to output electrical power at the grid frequency regardless of the rotational speed of the wind turbine blades.

A typical DFIG system includes a wind driven DFIG having a rotor and a stator. The stator of the DFIG is coupled to the electrical grid through a stator bus. A power converter is used to couple the rotor of the DFIG to the electrical grid. The power converter can be a two-stage power converter including both a rotor side converter and a line side converter. The rotor side converter can receive alternating current (AC) power from the rotor via a rotor bus and can convert the AC power to a DC power. The line side converter can then convert the DC power to AC power having a suitable output frequency, such as the grid frequency. The AC power is provided to the electrical grid via a line bus. An auxiliary power feed can be coupled to the line bus to provide power for components used in the wind turbine system, such as fans, pumps, motors, and other components of the wind turbine system.

A typical DFIG system includes a two-winding transformer having a high voltage primary (e.g. greater than 12 KVAC) and a low voltage secondary (e.g. 575 VAC, 690 VAC, etc.) to couple the DFIG system to the electrical grid. The high voltage primary can be coupled to the high voltage electrical grid. The stator bus providing AC power from the stator of the DFIG and the line bus providing AC power from the power converter can be coupled to the low voltage secondary. In this system, the output power of the stator and the output power of the power converter are operated at the same voltage and combined into the single transformer secondary winding at the low voltage.

More recently, DFIG systems have included a three winding transformer to couple the DFIG system to the electrical grid. The three winding transformer can have a high voltage (e.g. greater than 12 KVAC) primary winding coupled to the electrical grid, a medium voltage (e.g. 6 KVAC) secondary winding coupled to the stator bus, and a low voltage (e.g. 575 VAC, 690 VAC, etc.) auxiliary winding coupled to the line bus. The three winding transformer arrangement can be preferred in increased output power systems (e.g. 3 MW systems) as it reduces the current in the stator bus and other components on the stator side of the DFIG.

During operation of wind turbine systems, including DFIG systems, various fault events can occur, including grid under-voltage or over-voltage conditions and faults within the power system and/or associated wind turbine. This can result in excessive energy in the power converter, which can cause damage to the converter.

Various approaches have been utilized to reduce the risk of overvoltage conditions in power converters. For example, crowbars have been utilized as the initial action to prevent excess energy from reaching the power converter when a grid faults occur. Brake choppers have been utilized as the initial action to absorb such excess energy.

However, if a crowbar or brake chopper is utilized, the current level will quickly rise. If the rotor is open-circuited during a fault event, the voltage may rise to the locked rotor voltage of the generator. The components in the power converter have current and voltage limitations that the rotor would exceed if such conditions are not controlled.

Accordingly, improved methods for operating electrical power systems are desired. In particular, improved methods which protect the power converter in the event of a fault event would be advantageous.

BRIEF DESCRIPTION OF THE INVENTION

Aspects and advantages of the invention will be set forth in part in the following description, or may be obvious from the description, or may be learned through practice of the invention.

The present disclosure relates generally to electrical power systems and methods for operating electrical power systems. In accordance with the present disclosure, fault events are detected based on current levels in the power converter, such as in the rotor-side converter or line-side converter thereof. More specifically, bridge switching of the rotor-side converter and/or line-side converter is disabled when a bridge current magnitude exceeds a predetermined threshold. This advantageously reduces the maximum peak current relative to other fault event compensation mechanisms (such as crowbars) and enables higher voltage utilization to reduce the time of peak current caused by such event.

In particular, in some embodiments, when the rotor-side or line-side converter is disabled, the associated voltage will rise and be diode clamped to the DC link voltage. The increased voltage will cause the generator flux to decay faster and reduce the peak current. Additionally, in some exemplary embodiments, energy in the DC link will be dissipated via a dynamic brake.

Further, as discussed, in many cases, a dynamic brake can be utilized when disabling of the rotor-side or line-side converter has occurred. Further, one or more input variables for the power converter, such as current, energy, voltage, or temperature levels as discussed herein, may be monitored. During normal operation of the dynamic brake in a gated-on state, the dynamic brake can operate at any suitable duty cycle. However, if one or more of the input variables exceed a predetermined variable threshold, the dynamic brake may be forced to a 100 percent duty cycle. Such action bypasses any normal actions, such as by a controller, to determine a suitable duty cycle for the dynamic brake during normal gated-on operation thereof.

Still further, in some cases, a crowbar may be utilized as a last resort. The crowbar may be activated when disabling occurs and when the dynamic brake is gated on. For example, one or more input variables, such as DC link voltage or DC link energy, may be monitored. If one or more of the input variables exceeds a predetermined crowbar threshold, the crowbar may be activated.

In accordance with one embodiment, a method for operating an electrical power system is provided. The method includes disabling bridge switching of one of the rotor-side converter or line-side converter. The method further includes gating on the dynamic brake after the disabling occurs. The method further includes comparing a power converter input variable to a primary predetermined variable threshold, and forcing the gated-on dynamic brake to a 100 percent duty cycle when the power converter input variable exceeds the primary predetermined variable threshold.

In accordance with another embodiment, an electrical power system is provided. The electrical power system includes a doubly fed induction generator having a rotor and a stator, the stator providing AC power to a stator bus. The electrical power system further includes a power converter coupled to the rotor of the doubly fed induction generator, the power converter providing an output to a line bus, the power converter including a rotor-side converter, a line-side converter, a DC link, and a dynamic brake. The electrical power system further includes a transformer coupled to the stator bus and the line bus. The electrical power system further includes a controller communicatively coupled to the power converter, the controller configured to perform one or more operations. The one or more operations include disabling bridge switching of one of the rotor-side converter or line-side converter. The one or more operations further include gating on the dynamic brake after the disabling occurs. The one or more operations further include comparing a power converter input variable to a primary predetermined variable threshold, and forcing the gated-on dynamic brake to a 100 percent duty cycle when the power converter input variable exceeds the primary predetermined variable threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine according to one embodiment of the present disclosure;

FIG. 2 illustrates a perspective, internal view of a nacelle of a wind turbine according to one embodiment of the present disclosure;

FIG. 3 illustrates a schematic diagram of one embodiment of suitable components that may be included within a controller of a wind turbine and/or electrical power system;

FIG. 4 illustrates an electrical power system according to one embodiment of the present disclosure;

FIG. 5 illustrates an electrical power system according to another embodiment of the present disclosure; and FIG. 6 is a flow chart illustrating a method according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown, the wind turbine 10 may also include a turbine control system or a turbine controller 26 centralized within the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to various pitch drives or pitch adjustment mechanisms 32 (FIG. 2) of the wind turbine 10. Specifically, the rotor blades 22 may be rotatably mounted to the hub 20 by one or more pitch bearing(s) (not illustrated) such that the pitch angle may be adjusted by rotating the rotor blades 22 about their pitch axes 34 using the pitch adjustment mechanisms 32. Further, as the direction 28 of the wind changes, the turbine controller 26 may be configured to control a yaw direction of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10 such that the nacelle 16 may be rotated about the yaw axis 30.

Still further, the turbine controller 26 may be configured to control the torque of the generator 24. For example, the turbine controller 26 may be configured to transmit control signals/commands to the generator 24 in order to modulate the magnetic flux produced within the generator 24, thus adjusting the torque demand on the generator 24. Such temporary de-rating of the generator 24 may reduce the rotational speed of the rotor blades 22, thereby reducing the aerodynamic loads acting on the blades 22 and the reaction loads on various other wind turbine 10 components.

It should be appreciated that the turbine controller 26 may generally comprise a computer or any other suitable processing unit. Thus, in several embodiments, the turbine controller 26 may include one or more processor(s) and associated memory device(s) configured to perform a variety of computer-implemented functions, as shown in FIG. 3 and discussed herein. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the turbine controller 26 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 26 to perform various computer-implemented functions including, but not limited to, performing proportional integral derivative ("PID") control algorithms, including various calculations within one or more PID control loops, and various other suitable computer-implemented functions. In addition, the turbine controller 26 may also include various input/output channels for receiving inputs from sensors and/or other measurement devices and for sending control signals to various components of the wind turbine 10.

It should additionally be understood that the controller may be a singular controller or include various components, such as pitch controllers and/or yaw controllers, which communicate with a central controller for specifically controlling pitch and yaw as discussed. Additionally, the term "controller" may also encompass a combination of computers, processing units and/or related components in communication with one another.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. However, in other embodiments, it should be appreciated that the generator shaft 42 may be rotatably coupled directly to the rotor shaft 40. Alternatively, the generator 24 may be directly rotatably coupled to the rotor shaft 40 (often referred to as a "direct-drive wind turbine").

It should be appreciated that the rotor shaft 40 may generally be supported within the nacelle by a support frame or bedplate 46 positioned atop the wind turbine tower 12. For example, the rotor shaft 40 may be supported by the bedplate 46 via a pair of pillow blocks 48, 50 mounted to the bedplate 46.

Additionally, as indicated herein, the turbine controller 26 may also be located within the nacelle 16 of the wind turbine 10. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, as described herein, the turbine controller 26 may also be communicatively coupled to various components of the wind turbine 10 for generally controlling the wind turbine and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Similarly, the turbine controller 26 may also be communicatively coupled to each pitch adjustment mechanism 32 of the wind turbine 10 (one of which is shown) for controlling and/or altering the pitch angle of the rotor blades 22 relative to the direction 28 of the wind. For instance, the turbine controller 26 may be configured to transmit a control signal/command to each pitch adjustment mechanism 32 such that one or more actuators (not shown) of the pitch adjustment mechanism 32 may be utilized to rotate the blades 22 relative to the hub 20.

In particular, controller 26 may be utilized to perform such methods, and may further control torque adjustment of the generator 24, yaw adjustment of the wind turbine 10, and/or pitch adjustment of the rotor blades 22 based on such methods as discussed herein. Referring now to FIG. 3, there is illustrated a block diagram of one embodiment of suitable components that may be included within the turbine controller 26 in accordance with aspects of the present subject matter. As shown, the controller 26 may include one or more processor(s) 60 and associated memory device(s) 62 configured to perform a variety of computer-implemented functions (e.g., performing the methods, steps, calculations and the like disclosed herein). Additionally, the controller 26 may also include a communications module 64 to facilitate communications between the controller 26 and the various components of the wind turbine 10. For instance, the communications module 64 may serve as an interface to permit the turbine controller 26 to transmit control signals to each pitch adjustment mechanism 32 for controlling the pitch angle of the rotor blades 22. Moreover, the communications module 64 may include a sensor interface 66 (e.g., one or more analog-to-digital converters) to permit input signals transmitted from, for example, various sensor, to be converted into signals that can be understood and processed by the processors 60.

FIGS. 4 and 5 depict an exemplary electrical power system 100, which in this embodiment is a doubly-fed induction generator (DFIG) wind turbine system, according to an exemplary embodiment of the present disclosure. In the exemplary system 100, wind turbine 10 includes, as discussed above, an optional gear box 44, which is, in turn, coupled to a generator 24. In accordance with aspects of the present disclosure, the generator 24 is a doubly fed induction generator (DFIG) 24. It should be understood, however, that the present disclosure is not limited to DFIG systems 100 and DFIGs 24, and rather that any suitable system and generator, including for example full power conversion systems and generators, is within the scope and spirit of the present disclosure.

DFIG 24 is typically coupled to a stator bus 122 and a power converter 130 via a rotor bus 124. The stator bus 122 provides an output multiphase power (e.g. three-phase power) from a stator of DFIG 24 and the rotor bus 124 provides an output multiphase power (e.g. three-phase power) of the rotor of DFIG 24. Referring to the power converter 130, DFIG 24 is coupled via the rotor bus 124 to a rotor side converter 132. The rotor side converter 132 is coupled to a line side converter 134 which in turn is coupled to a line side bus 138.

The power converter 130 may include one or more rotor side switching elements 192, which may be components of the rotor side converter 132, and one or more line side switching elements 194, which may be components of the line side converter 134. The switching elements 192 for the various phases of the rotor side converter 132 may be included in the bridge of the rotor side converter 132, and the switching elements 194 for the various phases of the line side converter 134 may be included in the bridge of the line side converter 134. The switching elements 192, 194 in exemplary embodiments may be IGBTs. For example, in exemplary configurations, the rotor side converter 132 and the line side converter 134 are configured for normal operating mode in a three-phase, pulse width modulation (PWM) arrangement using insulated gate bipolar transistors (IGBTs) as switching devices. Other suitable switching devices can be used, such as insulated gate commuted thyristors, MOSFETs, bipolar transistors, silicon controlled rectifiers, or other suitable switching devices. The rotor side converter 132 and the line side converter 134 can be coupled via a DC link 135 across which is the DC link capacitor 136.

In some embodiments, a plurality of rotor-side converters 132 and/or line side converters 134 may be utilized, with the plurality of rotor-side converters 132 and/or line side converters 134 electrically coupled together in parallel.

The power converter 130 can be communicatively coupled to controller 26 to control the operation of the rotor side converter 132 and the line side converter 134. For instance, the controller 26 can send control commands to the rotor side converter 132 and line side converter 134 to control the modulation of switching elements (such as IGBTs) used in the power converter 130 to provide a desired real and reactive power output.

As illustrated, the system 100 includes a transformer 160 coupling the wind turbine system 100 to an electrical grid 180. The transformer 160 of FIG. 4 is a three-winding transformer that includes a high voltage (e.g. greater than 12 KVAC) primary winding 162 coupled to the electrical grid, a medium voltage (e.g. 6 KVAC) secondary winding 164 coupled to the stator bus 122, and a low voltage (e.g. 575 VAC, 690 VAC, etc.) auxiliary winding 166 coupled to the line bus 138. It should be understood that the transformer 160 can be a three-winding transformer as shown, or alternatively may be a two-winding transformer having only a primary winding 162 and a secondary winding 164; may be a four-winding transformer having a primary winding 162, a secondary winding 164, an auxiliary winding 166, and an additional auxiliary winding; or may have any other suitable number of windings.

An auxiliary power feed 170 is coupled to the output of the power converter 130. The auxiliary power feed 170 acts as a power source for various components of the wind turbine system 100. For instance, the auxiliary power feed 170 can power fans, pumps, motors, and other suitable components of the wind turbine system 100.

In operation, power generated at DFIG 24 by rotating the rotor 106 is provided via a dual path to electrical grid 180. The dual paths are defined by the stator bus 122 and the rotor bus 124. On the rotor bus 124 side, sinusoidal multi-phase (e.g. three-phase) alternating current (AC) power is provided to the power converter 130. The rotor side power converter 132 converts the AC power provided from the rotor bus 124 into direct current (DC) power and provides the DC power to the DC link 135. Switching devices (e.g. IGBTs) used in parallel bridge circuits of the rotor side power converter 132 can be modulated to convert the AC power provided from the rotor bus 124 into DC power suitable for the DC link 135.

The line side converter 134 converts the DC power on the DC link 135 into AC power at a frequency suitable for the electrical grid 180. In particular, switching devices (e.g. IGBTs) used in bridge circuits of the line side power converter 134 can be modulated to convert the DC power on the DC link 135 into AC power on the line side bus 138. The power from the power converter 130 can be provided via the auxiliary winding 166 of the transformer 160 to the electrical grid 180.

The power converter 130 can receive control signals from, for instance, the controller 26. The control signals can be based, among other things, on sensed conditions or operating characteristics of the wind turbine system 100. For instance, the control signals can be based on sensed voltage associated with the transformer 160 as determined by a voltage sensor 144. As another example, the control signals can be based on sensed voltage associated with the auxiliary power feed 170 as determined by a voltage sensor 146.

Typically, the control signals provide for control of the operation of the power converter 130. For example, feedback in the form of sensed speed of the DFIG 24 can be used to control the conversion of the output power from the rotor bus 156 to maintain a proper and balanced multi-phase (e.g. three-phase) power supply. Other feedback from other sensors can also be used by the controller 26 to control the power converter 130, including, for example, stator and rotor bus voltages and current feedbacks. Using the various forms of feedback information, switching control signals (e.g. gate timing commands for IGBTs), stator synchronizing control signals, and circuit breaker signals can be generated.

On the stator bus 122 side, sinusoidal multi-phase (e.g. three-phase) alternating current (AC) power is provided from the stator of the generator 120 to the stator bus 122, and from the stator bus 122 to the transformer 160, and in particular to the secondary winding 164 thereof. Various circuit breakers, fuses, contactors, and other devices, such as grid circuit breaker 158, stator bus circuit breaker 156, switch 154, and line bus circuit breaker 152, can be included in the system 100 to connect or disconnect corresponding buses, for example, when current flow is excessive and can damage components of the wind turbine system 100 or for other operational considerations. Additional protection components can also be included in the wind turbine system 100.

Referring still to FIGS. 4 and 5, a dynamic brake 180 may be provided in the power converter 130 between the rotor side converter 132 and the line side converter 134. The dynamic brake 180, when gated on, absorbs energy in the converter 130. For example, in exemplary embodiments as shown, a dynamic brake 180 may include a resistor 182 in series with a switch 184, which may for example be an IGBT.

Additionally, in some embodiments, a crowbar may be provided in the power converter 130. In some embodiments, as illustrated in FIG. 4, the crowbar may include the rotor-side switching elements 192. In alternative embodiments, as illustrated in FIG. 5, the crowbar may include additional switching elements 196 that are included in the power converter and located upstream of the rotor-side converter 132. When the crowbar is activated, the switching elements (i.e. elements 192 or elements 196) are gated on. When the crowbar is deactivated, the switching elements (i.e. elements 192 or elements 196) are gated off.

Referring now to FIGS. 4 through 6, the present disclosure is further directed to methods for operating electrical power systems 100. In some embodiments, controller 26 is configured to perform such operations. A method 300 may include, for example, the step 310 of detecting a bridge current magnitude 312 in the one or more rotor-side converter(s) 132 or one or more line-side converter(s) 134. Such step 310 may utilize the bridge current magnitude 312 in all rotor-side converters 132 or line side converters 134 of a power converter 130. The bridge current magnitude 312 corresponds to the vector magnitude of the instantaneous current (at a single time) of all phases in the system at the bridge of the one or more rotor-side converter(s) 132 or line-side converter(s) 134. For example, in some embodiments for a single rotor side converter 132 or line side converter 134, the bridge current magnitude 312 may be the sum of the instantaneous current in each phase at a bridge squared, such as follows:

$$I_{mag} = I_{a_{inst}}^2 + I_{b_{inst}}^2 + \ldots I_{x_{inst}}^2$$

In other embodiments, the bridge current magnitude 312 may be the square root of the sum of the instantaneous current in each phase at the bridge squared, such as follows:

$$I_{mag} = SQRT(I_{a_{inst}}^2 + I_{b_{inst}}^2 + \ldots I_{x_{inst}}^2)$$

In other embodiments, the bridge current magnitude 312 may be the square root of two/thirds times the square root of the sum of the instantaneous current in each phase at the bridge squared, such as follows:

$$I_{mag} = SQRT\left(\frac{2}{3}\right) * SQRT(I_{a_{inst}}^2 + I_{b_{inst}}^2 + \ldots I_{x_{inst}}^2)$$

When the power converter 130 includes a plurality of rotor-side converters 132 or line-side converters 134, the bridge current magnitude corresponds to sum of the bridge current magnitudes in each bridge of each one of the plurality of rotor-side converters 132 or line-side converters 134, such as follows:

$$I_{mag}^2 = [(I_{a1_{inst}}^2 + \ldots I_{an_{inst}}^2)^2 +$$
$$(I_{b1_{inst}}^2 + \ldots I_{bn_{inst}}^2)^2 + \ldots (I_{x1_{inst}}^2 + \ldots I_{xn_{inst}}^2)^2] * \frac{2}{3}$$
$$I_{mag}^2 = [(I_{a1_{inst}}^2 + \ldots I_{an_{inst}}^2)^2 +$$
$$(I_{b1_{inst}}^2 + \ldots I_{bn_{inst}}^2)^2 + \ldots (I_{x1_{inst}}^2 + \ldots I_{xn_{inst}}^2)^2]$$
$$I_{mag_{total}}^2 = (I_{mag_1} + \ldots I_{mag_n})^2$$
$$I_{mag_{total}} = (I_{mag_1} + \ldots I_{mag_n})$$

It should be understood that other suitable variations of the above equations may be utilized, such as for ease of programming and computation purposes.

Method 300 may further include, for example, the step 320 of comparing the bridge current magnitude 312 in the one or more rotor-side converter(s) 132 or line-side converter(s) 134 to a primary predetermined magnitude threshold 322. The primary predetermined magnitude threshold 322 may correspond to a predetermined threshold that indicates that a fault event has occurred. Such threshold may be predetermined and thus, for example, programmed into the controller 26.

Method 300 may further include, for example, the step 330 of disabling bridge switching of the one or more rotor-side converter(s) 132 or line-side converter(s) 134. In exemplary embodiments, such disabling is performed when the bridge current magnitude 312 exceeds the primary predetermined magnitude threshold 322. When bridge switching is disabled for the rotor-side converter(s) 132, no switching of any of the switching elements 192 in any of the one or more rotor-side converter(s) 132 occurs. When bridge switching is disabled for the line-side converter(s) 134, no switching of any of the switching elements 194 in any of the one or more line-side converter(s) 134 occurs. Further, in exemplary embodiments, such switching elements 192 or 194 are disabled in gated-open positions. Accordingly, in these embodiments, when bridge switching is disabled for the rotor-side converter(s) 132, all switching elements 192 in all of the one or more rotor-side converter(s) 132 are disabled in gated-open positions. Similarly, in these embodiments, when bridge switching is disabled for the line-side converter(s) 134, all switching elements 194 in all of the one or more line-side converter(s) 134 are disabled in gated-open positions.

As discussed, power converter 130 may include a dynamic brake 180. Accordingly, in some exemplary embodiments, the dynamic brake 180 may be gated on (such as is shown in step 335) after disabling occurs in accordance with step 330 and while such disabled state is occurring. Gating on of the dynamic brake 180 may, in exemplary embodiments, occur independently of steps 310, 320, 330. However, such gating on may occur as a result of the rise in voltage across the DC link 135, such as when the voltage exceeds a primary voltage threshold.

Further, in some exemplary embodiments and after gating on of the dynamic brake 180, the dynamic brake 180 may be gated off after disabling occurs in accordance with step 330 and either while such disabled state is occurring or after enabling occurs as discussed herein. Gating off of the dynamic brake 180 may, in exemplary embodiments, occur independently of steps 310, 320, 330. However, such gating off may occur as a result of a subsequent lowering in voltage across the DC link 135 after gating on of the dynamic brake 180, such as when the voltage falls below and thus is less than a secondary voltage threshold (which may be the same or different from the primary voltage threshold).

Method 300 may further include, for example, the step 340 of comparing the bridge current magnitude 312 in the one or more rotor-side converter(s) 132 or line-side converter(s) 134 to a secondary predetermined magnitude threshold 342. Such step 340 occurs after step 330, and is thus based on the bridge current magnitude 312 at a time after such step 330 has occurred. The secondary predetermined magnitude threshold 342 may correspond to a predetermined threshold that indicates that a fault event has ended or that the risk of enabling switching in the power converter 130 is appropriately reduced after a fault event has occurred. Such threshold may be predetermined and thus, for example, programmed into the controller 26.

In some exemplary embodiments, the secondary predetermined magnitude threshold 342 is different from the primary predetermined magnitude threshold 322. Alternatively, the secondary predetermined magnitude threshold 342 is the same as the primary predetermined magnitude threshold 322.

Method 300 may further include, for example, the step 350 of enabling bridge switching of the one or more rotor-side converter(s) 132 or line-side converter(s) 134. In exemplary embodiments, such enabling is performed when the bridge current magnitude 312 falls below and thus is less than the secondary predetermined magnitude threshold 342. When bridge switching is enabled for the rotor-side converter(s) 132, switching of the switching elements 192 in the one or more rotor-side converter(s) 132 again occurs, similar to the occurrence of such switching before the occurrence of step 330. When bridge switching is enabled for the line-side converter(s) 134, switching of the switching elements 194 in the one or more line-side converter(s) 134 again occurs, similar to the occurrence of such switching before the occurrence of step 330.

Methods in accordance with present disclosure may further include additional safeguards to prevent power converter 130 damage that are implemented when the dynamic brake 180 is gated on. For example, method 300 may include the step 400 of comparing a power converter input variable 402 to a primary predetermined variable threshold 404. In general, the power converter input variable 402 may be any detected variable, such as a current level, voltage level, energy level, or temperature, within the power converter 130.

For example, the power converter input variable 402 may include one or more of a DC link voltage, a DC link energy (determined for example via the DC link voltage and known capacitance of the DC link), a DC link current, a rotor-side converter bridge current magnitude (as discussed herein), a rotor-side converter bridge voltage magnitude, a rotor-side converter bridge instantaneous current, a rotor-side converter bridge instantaneous voltage, a line-side converter bridge current magnitude (as discussed herein), a line-side converter bridge voltage magnitude, a line-side converter bridge instantaneous current, a line-side converter bridge instantaneous voltage, or a power converter component temperature. Components of the power converter 130 from which temperatures may be detected include switching elements 192, 194, 196, diodes, etc.

As discussed, in some embodiments, bridge voltage magnitude may be utilized. In these cases, such step 400 may utilize the bridge voltage magnitude in all rotor-side converters 132 or line side converters 134 of a power converter 130. The bridge voltage magnitude corresponds to the vector magnitude of the instantaneous voltage (at a single time) of all phases in the system at the bridge of the one or more rotor-side converter(s) 132 or line-side converter(s) 134. For example, in some embodiments for a single rotor side converter 132 or line side converter 134, the bridge voltage magnitude 312 may be the sum of the instantaneous voltage in each phase at a bridge squared, such as follows:

$$V_{mag} = V_{a_{inst}}^2 + V_{b_{inst}}^2 + \ldots V_{x_{inst}}^2$$

In other embodiments, the bridge voltage magnitude 312 may be the square root of the sum of the instantaneous voltage in each phase at the bridge squared, such as follows:

$$V_{mag} = \text{SQRT}(V_{a_{inst}}^2 + V_{b_{inst}}^2 + \ldots V_{x_{inst}}^2)$$

In other embodiments, the bridge voltage magnitude 312 may be the square root of two/thirds times the square root of the sum of the instantaneous voltage in each phase at the bridge squared, such as follows:

$$V_{mag} = \text{SQRT}\left(\frac{2}{3}\right) * \text{SQRT}(V_{a_{inst}}^2 + V_{b_{inst}}^2 + \ldots V_{x_{inst}}^2)$$

When the power converter 130 includes a plurality of rotor-side converters 132 or line-side converters 134, the bridge voltage magnitude corresponds to sum of the bridge voltage magnitudes in each bridge of each one of the plurality of rotor-side converters 132 or line-side converters 134, such as follows:

$$V_{mag}^2 = [(V_{a1_{inst}}^2 + \ldots V_{an_{inst}}^2)^2 + (V_{b1_{inst}}^2 + \ldots V_{bn_{inst}}^2)^2 + \ldots (V_{x1_{inst}}^2 + \ldots V_{xn_{inst}}^2)^2] * \frac{2}{3}$$

$$V_{mag}^2 = [(V_{a1_{inst}}^2 + \ldots V_{an_{inst}}^2)^2 + (V_{b1_{inst}}^2 + \ldots V_{bn_{inst}}^2)^2 + \ldots (V_{x1_{inst}}^2 + \ldots V_{xn_{inst}}^2)^2]$$

or $$V_{mag_{total}}^2 = (V_{mag_1} + \ldots V_{mag_n})^2$$

$$V_{mag_{total}} = (V_{mag_1} + \ldots V_{mag_n})$$

It should be understood that other suitable variations of the above equations may be utilized, such as for ease of programming and computation purposes.

As discussed, in step 400 the power converter input variable 402 is compared to a primary predetermined variable threshold 404. Such threshold may be predetermined and thus, for example, programmed into the controller 26.

Method 300 may further include, for example, the step 410 of forcing the gated-on dynamic brake 180 to a 100 percent duty cycle when the power converter input variable 402 exceeds the primary predetermined variable threshold 404. Such steps acts as an override function, such that any controls actions which are normally utilized to determine the duty cycle of the dynamic brake 180 when gated on are disabled or overridden and the dynamic brake 180 is maintained in the gated on position at 100 percent duty cycle.

Method 300 may further include, for example, the step 420 of comparing the power converter input variable 402 to a secondary predetermined variable threshold 422. Such step occurs after step 410, such that forcing of the dynamic brake 180 to a 100 percent duty cycle has occurred and the dynamic brake 180 is operating at 100 percent duty cycle. Such threshold may be predetermined and thus, for example, programmed into the controller 26.

In some exemplary embodiments, the secondary predetermined variable threshold 422 is different from the primary predetermined variable threshold 404. Alternatively, the secondary predetermined variable threshold 422 is the same as the primary predetermined variable threshold 404.

Method 400 may further include, for example, the step 430 of terminating the forced 100 percent duty cycle of the gated-on dynamic brake 180 when the power converter input variable 402 is less than the secondary predetermined variable threshold 422. Accordingly, the override function is disabled, and any normal controls actions utilized to determine the duty cycle of the dynamic brake 180 when gated on are activated and/or utilized, without 100 percent duty cycle being required.

As discussed, in some embodiments a crowbar may be utilized. In these embodiment, the crowbar is utilized as a measure of last resort to attempt to prevent power converter 130 hardware damage. Accordingly, in some embodiments, method 300 may include the step 440 of comparing one of a DC link voltage or a DC link energy to a primary predetermined crowbar threshold 442. Such threshold may be predetermined and thus, for example, programmed into the controller 26. In some embodiments, such step occurs after step 410 has occurred, such that the dynamic brake 180 is gated on at 100 percent duty cycle. In other embodiments, such step may occur in addition to or alternatively to step 400, such as after the dynamic brake 180 has been gated on.

Method 300 may further include, for example, the step 450 of activating the crowbar when the one of the DC link voltage or the DC link energy exceeds the primary predetermined crowbar threshold 442.

Method 300 may further include, for example, the step 460 of comparing the one of the DC link voltage or the DC link energy to a secondary predetermined crowbar threshold 462. Such step occurs after step 450, such that the crowbar is activated. Such threshold may be predetermined and thus, for example, programmed into the controller 26.

In some exemplary embodiments, the secondary predetermined crowbar threshold 462 is different from the primary predetermined crowbar threshold 442. Alternatively, the secondary predetermined crowbar threshold 462 is the same as the primary predetermined crowbar threshold 442.

Method 400 may further include, for example, the step 470 of deactivating the crowbar when the one of the DC link voltage or the DC link energy is less than the secondary predetermined crowbar threshold 462.

It should be noted that in exemplary embodiments, when step 450 occurs, step 460 and 470 must occur before step 430 can occur.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an electrical power system, the method comprising:
   disabling bridge switching of one of the rotor-side converter or line-side converter;
   gating on the dynamic brake after the disabling occurs;
   comparing a power converter input variable to a primary predetermined variable threshold; and
   forcing the gated-on dynamic brake to a 100 percent duty cycle when the power converter input variable exceeds the primary predetermined variable threshold.

2. The method of claim 1, further comprising:
   comparing, after forcing occurs, the power converter input variable to a secondary predetermined variable threshold; and
   terminating the forced 100 percent duty cycle of the gated-on dynamic brake when the power converter input variable is less than the secondary predetermined variable threshold.

3. The method of claim 1, wherein the secondary predetermined variable threshold is different from the primary predetermined variable threshold.

4. The method of claim 1, wherein the power converter input variable comprises one or more of a DC link voltage, a DC link energy, a DC link current, a rotor-side converter bridge current magnitude, a rotor-side converter bridge voltage magnitude, a rotor-side converter bridge instantaneous current, a rotor-side converter bridge instantaneous voltage, a line-side converter bridge current magnitude, a line-side converter bridge voltage magnitude, a line-side converter bridge instantaneous current, a line-side converter bridge instantaneous voltage, or a power converter component temperature.

5. The method of claim 1, further comprising:
   comparing one of a DC link voltage or a DC link energy to a primary predetermined crowbar threshold; and
   activating a crowbar when the one of the DC link voltage or a DC link energy exceeds the primary predetermined crowbar threshold.

6. The method of claim 5, wherein the crowbar comprises switching elements of the rotor-side converter.

7. The method of claim 5, wherein the crowbar comprises switching elements disposed upstream of the rotor-side converter within the power converter.

8. The method of claim 1, wherein the one of the rotor-side converter or line-side converter is a plurality of rotor-side converters connected in parallel or a plurality of line-side converters connected in parallel.

9. The method of claim 1, further comprising:
   detecting a bridge current magnitude in a rotor-side converter or line-side converter of a power converter, the power converter electrically coupled between a generator rotor and a transformer and comprising a DC link and a dynamic brake; and
   comparing the bridge current magnitude in the one of the rotor-side converter or line-side converter to a primary predetermined magnitude threshold,
   wherein disabling occurs when the bridge current magnitude exceeds the primary predetermined magnitude threshold.

10. The method of claim 9, further comprising:
    comparing, after disabling occurs, the bridge current magnitude in the one of the rotor-side converter or line-side converter to a secondary predetermined threshold; and
    enabling bridge switching of the one of the rotor-side converter or line-side converter when the bridge current magnitude is less than the secondary predetermined threshold.

11. An electrical power system, comprising:
    a doubly fed induction generator having a rotor and a stator, the stator providing AC power to a stator bus;
    a power converter coupled to the rotor of the doubly fed induction generator, the power converter providing an output to a line bus, the power converter comprising a rotor-side converter, a line-side converter, a DC link and a dynamic brake;
    a transformer coupled to the stator bus and the line bus; and
    a controller communicatively coupled to the power converter, the controller configured to perform one or more operations, the one or more operations comprising:
    disabling bridge switching of one of the rotor-side converter or line-side converter;
    gating on the dynamic brake after the disabling occurs;
    comparing a power converter input variable to a primary predetermined variable threshold; and
    forcing the gated-on dynamic brake to a 100 percent duty cycle when the power converter input variable exceeds the primary predetermined variable threshold.

12. The electrical power system of claim 11, wherein the one or more operations further comprises:

comparing, after forcing occurs, the power converter input variable to a secondary predetermined variable threshold; and terminating the forced 100 percent duty cycle of the gated-on dynamic brake when the power converter input variable is less than the secondary predetermined variable threshold.

13. The electrical power system of claim 11, wherein the secondary predetermined variable threshold is different from the primary predetermined variable threshold.

14. The electrical power system of claim 11, wherein the power converter input variable comprises one or more of a DC link voltage, a DC link energy, a DC link current, a rotor-side converter bridge current magnitude, a rotor-side converter bridge voltage magnitude, a rotor-side converter bridge instantaneous current, a rotor-side converter bridge instantaneous voltage, a line-side converter bridge current magnitude, a line-side converter bridge voltage magnitude, a line-side converter bridge instantaneous current, a line-side converter bridge instantaneous voltage, or a power converter component temperature.

15. The electrical power system of claim 11, wherein the one or more operations further comprises:

comparing one of a DC link voltage or a DC link energy to a primary predetermined crowbar threshold; and activating a crowbar when the one of the DC link voltage or a DC link energy exceeds the primary predetermined crowbar threshold.

16. The electrical power system of claim 15, wherein the crowbar comprises switching elements of the rotor-side converter.

17. The electrical power system of claim 15, wherein the crowbar comprises switching elements disposed upstream of the rotor-side converter within the power converter.

18. The electrical power system of claim 11, wherein the one of the rotor-side converter or line-side converter is a plurality of rotor-side converters connected in parallel or a plurality of line-side converters connected in parallel.

19. The electrical power system of claim 11, wherein the one or more operations further comprises:

detecting a bridge current magnitude in the rotor-side converter or line-side converter; and comparing the bridge current magnitude in the one of the rotor-side converter or line-side converter to a primary predetermined magnitude threshold, wherein disabling occurs when the bridge current magnitude exceeds the primary predetermined magnitude threshold.

20. The electrical power system of claim 19, wherein the one or more operations further comprises:

comparing, after disabling occurs, the bridge current magnitude in the one of the rotor-side converter or line-side converter to a secondary predetermined threshold; and enabling bridge switching of the one of the rotor-side converter or line-side converter when the bridge current magnitude is less than the secondary predetermined threshold.

* * * * *